E. A. SCHMUTTE.
BLADE FOR AGRICULTURAL IMPLEMENTS.
APPLICATION FILED AUG. 1, 1919.
1,346,261.
Patented July 13, 1920.
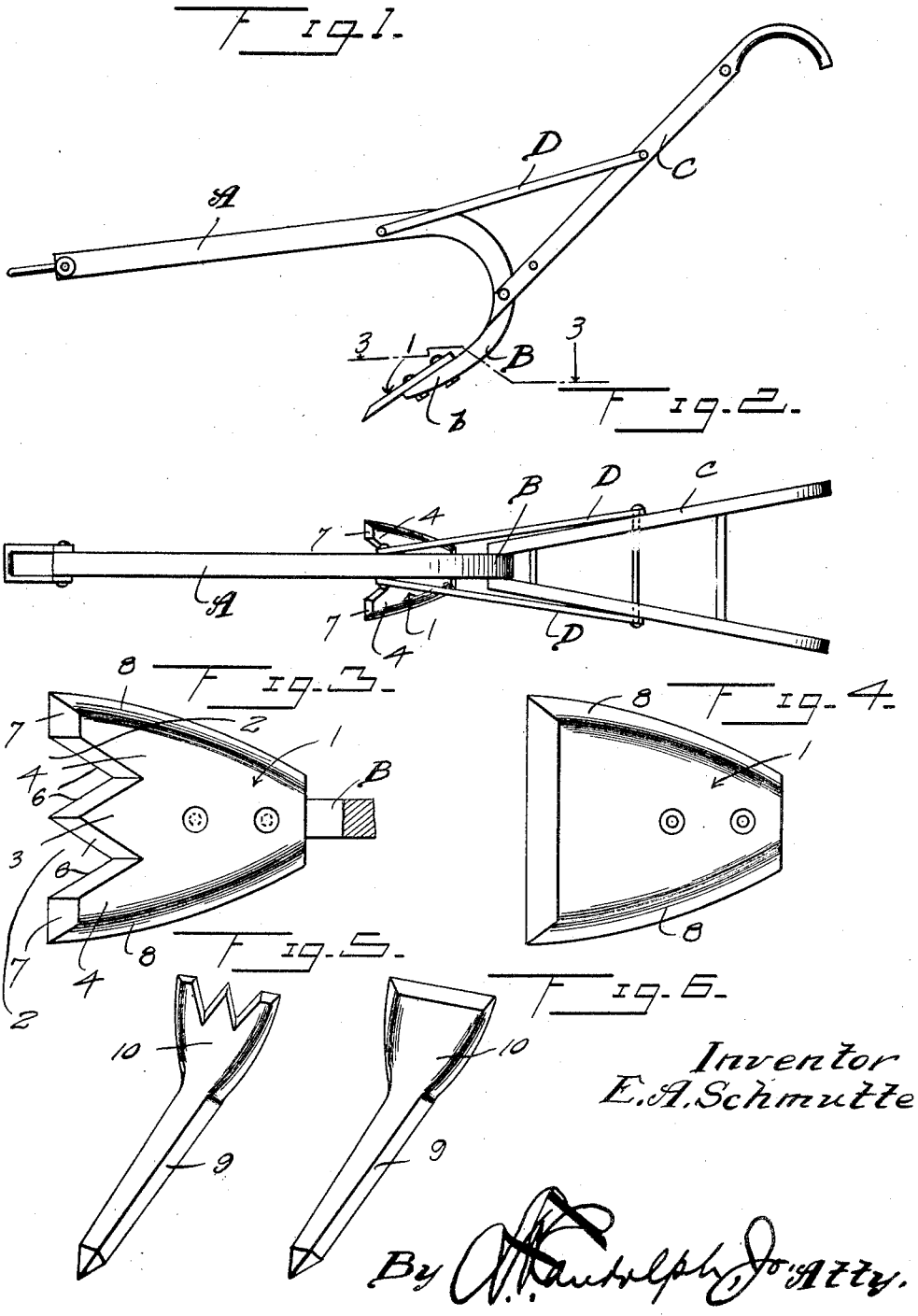

UNITED STATES PATENT OFFICE.

ERNEST A. SCHMUTTE, OF WHITE BLUFFS, TENNESSEE.

BLADE FOR AGRICULTURAL IMPLEMENTS.

1,346,261.  Specification of Letters Patent.  Patented July 13, 1920.

Application filed August 1, 1919. Serial No. 314,706.

*To all whom it may concern:*

Be it known that I, ERNEST A. SCHMUTTE, a citizen of the United States, residing at White Bluffs, in the county of Dickson and State of Tennessee, have invented certain new and useful Improvements in Blades for Agricultural Implements; and I do hereby declare the following to be a full, clear, and exact description of the invention, such as will enable others skilled in the art to which it appertains to make and use the same.

This invention relates to agricultural implements, and more particularly to an agricultural implement provided with a cutting share or blade.

One of the main objects of the invention is to provide a blade adapted to be secured to the standard or stock of a cultivator, this blade being so shaped and disposed as to loosen the soil while also being provided with a cutting edge for effectually cutting off or severing weeds, briers, and other undesirable plants.

A further object is to provide a blade of simple construction and operation which may be readily applied and which is so shaped as to insure effectual cutting of the roots of plants so as to destroy or greatly retard the growth of the same.

Further objects will appear from the detailed description.

In the drawings:

Figure 1 is a side view of a cultivator of standard construction provided with an attachment constructed in accordance with my invention.

Fig. 2 is a top plan view of the blade.

Fig. 3 is a section taken substantially on line 3—3 of Fig. 1.

Fig. 4 is a top plan view of the blade showing a modified construction.

Fig. 5 is a perspective view showing a harrow tooth provided with a head having a construction similar to the blade shown in Fig. 2.

Fig. 6 is a view similar to Fig. 5 showing the head of the harrow tooth provided with a construction similar to that shown in Fig. 4.

The agricultural implement illustrated is of standard construction embodying a beam A provided at its rearward end with a standard or stock B to which the handles C are secured, these handles being held in proper position by braces D. The standard B is provided at its lower end portion with an angularly disposed forwardly directed portion *b* upon the upper face of which is secured a cultivating blade 1, as shown in Fig. 2, which is of substantial triangular outline having its broader end or base directed forwardly, and is provided with spaced openings for reception of the securing bolts. The blade 1 is inclined downwardly and forwardly of the cultivator and is provided at its forward end with two spaced V-shaped cutouts 2 which form a central forwardly directed triangular shaped tooth 3 and lateral cutting teeth 4 of substantial truncated triangular shape. The lateral portion of central tooth 3 and the inner lateral portion of the outer lateral tooth 4 are beveled to provide contiguous cutting edges 6 which converge upwardly and rearwardly of the blade. The forward ends of the teeth 4 are also beveled downwardly and forwardly to provide cutting edges 7 disposed at right angles to the direction of travel of the cultivator. To insure easy entry of the blade into the soil and reduce resistance to a minimum, the lateral portions of the blade are rounded as at 8.

In practice, during advancement of the implements, the blade 1 which travels beneath the surface of the soil serves to elevate and loosen and break up the soil so as to form a mulch therefrom, the rearwardly converging V-shaped cutouts 2 and the central cutting tooth 3 coöperating to direct the root portions of briers and other undesirable plants into engagement with the cutting edges 6 so as to be severed thereby thus killing these plants or greatly retarding their growth. The substantially straight cutting edges 7 at the forward ends of the outer teeth 4 also serve to engage and cut the roots of plants adjacent the sides of the forward ends of the blade. The blade, due to its rearwardly tapering shape and the bevel of the lateral portions 8, is adapted to readily enter into and pass through the soil and to elevate and break up the strata or layer thereof in the manner described. In smooth level land the forward or cutting end of the blade 1 may be made straight instead of provided with the V-shaped cutouts 2, though I prefer to employ the form illustrated in Figs. 2 and 3 as I have found by experience that this form is better adapted to meet the varying conditions which are often encountered in agricultural work. I have found this form of attachment or blade for a cultivator of great practical service as, in land such as that encountered in many sections of the South where there are great numbers of brier and other roots, the ordinary center bursting cultivator simply divides these roots instead of cutting them off thus increasing the growth of these plants instead of destroying or retarding their growth.

In Figs. 5 and 6 there has been shown a modification in which a harrow tooth 9 is shown provided with a head having a construction similar to the blade 1. This harrow tooth, with the exception of the head applied thereto, is of a conventional construction and will be mounted in an ordinary harrow frame. From an inspection of Figs. 5 and 6 it will be noted that the head 10 of the tooth may be provided with teeth if desired similar to the showing of the blade in Fig. 2 or may have a smooth cutting edge similar to the showing in Fig. 4. The harrow teeth under ordinary circumstances will be put in place with the pointed ends extended downwardly as is customary in harrows of this type but if it is desired to use the device for removing weeds from land which has previously been prepared for planting, the teeth will be removed and reversed in their position thus bringing the heads 10 into engagement with the ground. These heads will cut into the ground and sever the roots of the weeds thus killing them.

What I claim is:

1. A device of the character described comprising, a blade of substantial triangular shape adapted to be secured to a cultivator standard with its broader end directed forwardly thereof, the broader end of the blade being provided with spaced rearwardly converging relatively deep cutouts providing a central forwardly directed substantially V-shape tooth and forwardly directed side arms contiguous thereto, the inner lateral edges of said side arms and the lateral edges of the tooth being beveled to provide rearwardly converging cutting edges.

2. In cultivator attachments, a blade of substantial triangular shape adapted to be secured to a cultivator standard so as to project forwardly therefrom, said blade being provided at its broader end with a central V-shaped cutting tooth and lateral members of substantial truncated triangular shape contiguous thereto, the lateral edges of said members and of the tooth being beveled to provide sets of rearwardly converging cutting edges, and the forward ends of the teeth being beveled to provide forwardly directed cutting edges.

3. A device of the character described comprising, a blade of substantial triangular shape, the broader end of the blade being provided with spaced rearwardly converging relatively deep cutouts providing a central forwardly directed substantially V-shaped tooth and forwardly directed side arms contiguous thereto, the inner lateral edges of said side arms and the lateral edges of the tooth being beveled to provide rearwardly converging cutting edges.

In testimony whereof I affix my signature in presence of two witnesses.

ERNEST A. SCHMUTTE.

Witnesses:
ELEANOR PRICE,
R. L. STRINGFELLOW.